US008687163B2

(12) United States Patent
Sasaki (10) Patent No.: US 8,687,163 B2
(45) Date of Patent: Apr. 1, 2014

(54) DISPLAY PANEL AND LIQUID CRYSTAL DISPLAY DEVICE HAVING PARTICULAR SEALING STRUCTURE

(75) Inventor: Nobuo Sasaki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 170 days.

(21) Appl. No.: 13/509,941

(22) PCT Filed: Aug. 9, 2010

(86) PCT No.: PCT/JP2010/063497
§ 371 (c)(1),
(2), (4) Date: May 29, 2012

(87) PCT Pub. No.: WO2011/058796
PCT Pub. Date: May 19, 2011

(65) Prior Publication Data
US 2012/0229743 A1    Sep. 13, 2012

(30) Foreign Application Priority Data

Nov. 16, 2009    (JP) .................................. 2009-261205

(51) Int. Cl.
*G02F 1/1339*    (2006.01)
*G02F 1/1337*    (2006.01)

(52) U.S. Cl.
USPC ........... 349/153; 349/190; 349/155; 349/156; 349/123

(58) Field of Classification Search
CPC ... G02F 1/1339; G02F 1/1341; G02F 1/1345; G02F 1/13394; G02F 1/13392; G02F 1/133512; G02F 1/133377; G02F 1/1337; G02F 1/133711; G02F 1/134363; G02F 2001/13415
USPC .......................... 349/153, 190, 155, 156, 123
See application file for complete search history.

(56) References Cited

U.S. PATENT DOCUMENTS 6,304,308 B1 * 10/2001 Saito et al. .................... 349/155
7,459,379 B2 * 12/2008 Kokubo et al. ............... 438/476

FOREIGN PATENT DOCUMENTS

| JP | 2007-114361 A | 5/2007 |
| JP | 2007-199341 A | 8/2007 |
| JP | 2007-256415 A | 10/2007 |
| JP | 2007-304452 A | 11/2007 |
| JP | 2008-209481 A | 9/2008 |

* cited by examiner

*Primary Examiner* — Mike Qi
(74) *Attorney, Agent, or Firm* — Chen Yoshimura LLP (57) ABSTRACT

The present invention provides a display panel that can improve the adhesion strength of a sealing member and that can reduce moisture permeation caused by an alignment film without performing a treatment to remove the alignment film. A display panel according to the present invention is a display panel having a pair of substrates attached to each other via a sealing member. At least one of the pair of substrates has a configuration in which a transparent resin film and an alignment film are laminated. In the display panel, a side face of an edge of the transparent resin film has a reverse tapered shape; the alignment film is separated at the side face of the edge; and the transparent resin film and the sealing member are attached to each other without having the alignment film therebetween.

3 Claims, 7 Drawing Sheets

DISPLAY PANEL AND LIQUID CRYSTAL DISPLAY DEVICE HAVING PARTICULAR SEALING STRUCTURE

TECHNICAL FIELD

The present invention relates to a display panel and to a liquid crystal display device. More specifically, the present invention relates to a display panel and to a liquid crystal display device that have an alignment film applied on a substrate.

BACKGROUND ART

A liquid crystal display device (hereinafter abbreviated as an LCD) is a display device that is characterized by its thinness, light weight, and low power consumption. It has been used for many purposes, such as a mobile phone, a PDA, an automotive navigation system, a personal computer monitor, and a television, as well as for information displays and the like, such as a guideboard in a station, an outdoor bulletin board, and the like.

A current LCD controls arrangement of liquid crystal molecules; changes a polarization state of light transmitted through a liquid crystal layer; and adjusts an amount of light transmitted through a polarizing plate in order to perform display. Display performance of the LCD is affected by an orientation state of the liquid crystal molecules. As orientation states of the liquid crystal molecules, there are an orientation state when a voltage is not applied and an orientation state when an electric filed is applied. Particularly, in order to control the orientation state of the liquid crystal molecules when a voltage is not applied, an alignment film is commonly applied on a substrate.

However, when the alignment film is formed also under a sealant region of the LCD by a printing method or the like, such as flexo printing, offset printing, or the like, adhesion between the sealant and the substrate deteriorates. In order to address this issue, a patterning method of an alignment film in which the alignment film formed in an unnecessary portion is removed by radiating a laser beam after the alignment film is formed is disclosed, for example (see Patent Document 1, for example). Furthermore, a liquid crystal display device in which a structure to remove an alignment film is disposed at a location where a sealant is disposed is disclosed (see Patent Document 2, for example).

Here, when attaching the sealant on a glass substrate with a resin film therebetween, from a standpoint of securing a sufficient level of adhesion strength, there has been disclosed an electro-optical device that has a pair of substrates facing each other, a resin film disposed on at least one of the pair of substrates, a sealant that bonds the pair of substrates to each other with the resin film therebetween, and an electro-optical substance disposed in a space between the pair of substrates surrounded by the sealant, for example. In this electro-optical device, an opening is provided in a region of the resin film that is in contact with the sealant so as to expose the substrates, and the width of the opening is narrower than the width of the sealant (see Patent Document 3, for example). However, effects of the alignment film were not taken into account, and there has been no disclosure regarding this issue.

RELATED ART DOCUMENTS

Patent Document 1: Japanese Patent Application Laid-Open Publication No. 2007-114361

Patent Document 2: Japanese Patent Application Laid-Open Publication No. 2007-304452

Patent Document 3: Japanese Patent Application Laid-Open Publication No. 2007-199341

SUMMARY OF THE INVENTION

Problems to be Solved by the Invention

Figure 10:
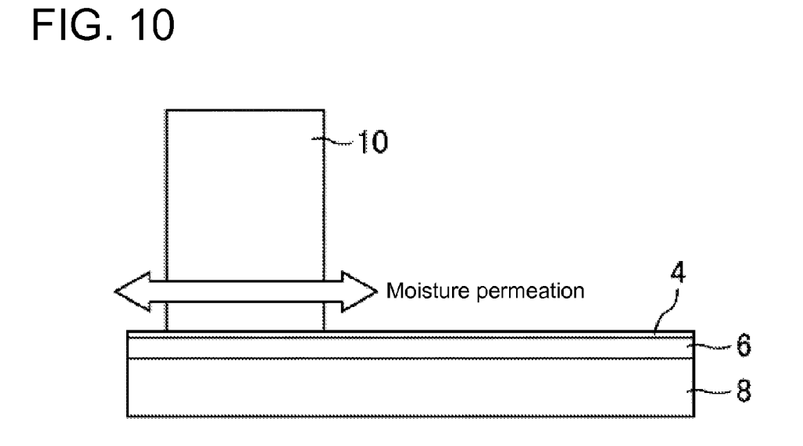
FIG. 10 is a cross-sectional schematic view showing a substrate in a conventional display panel.

In a display panel used in a liquid crystal display device, when an alignment film is disposed under the arrangement region of a sealing member (may be referred to as a sealant), there is a risk of adhesion strength of the sealing member deteriorating. Further, there is also a risk of moisture permeation caused by the alignment film (see FIG. 10, for example).

Figure 11:
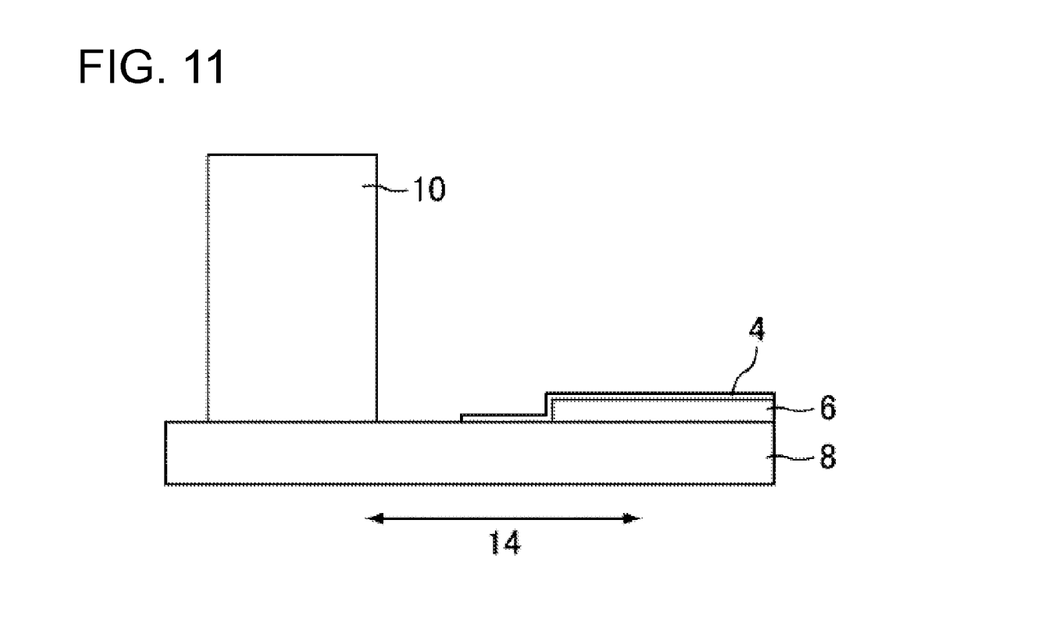
FIG. 11 is a cross-sectional schematic view showing a substrate in a conventional display panel.

As an example of a method of decreasing the effects of the alignment film under the arrangement region of the sealing member, in the case of applying the alignment film by flexo printing or the like, there is a method in which the size of a panel frame region is increased such that display anomalies inside an active area caused by an uneven application of the alignment film can be prevented, and an alignment film application region is adjusted so that the alignment film is at least not coated on the entire sealing member arrangement region (see FIG. 11, for example). This method needed improvement in terms of reducing the size of the display panel.

Figure 12:
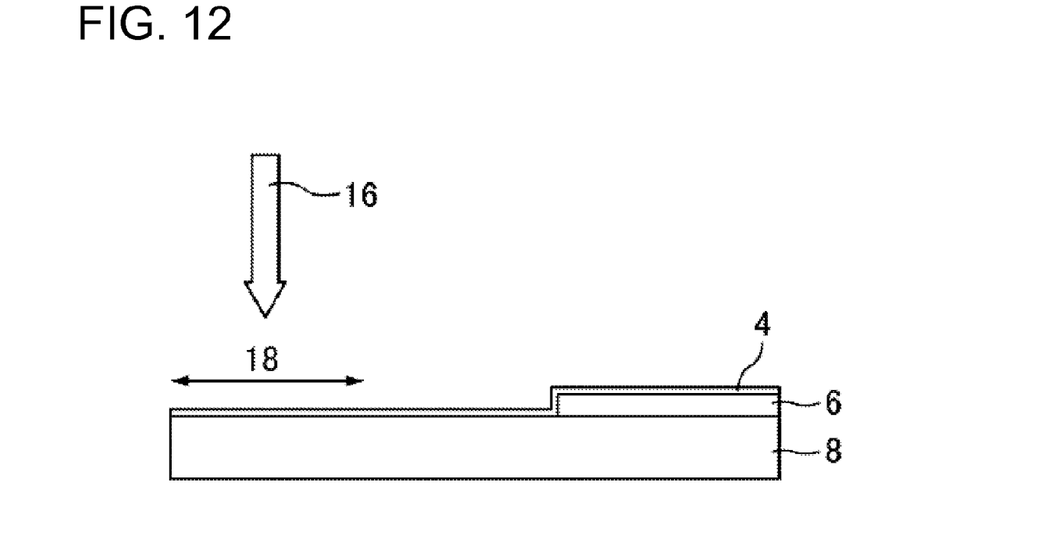
FIG. 12 is a cross-sectional schematic view showing a substrate in a conventional display panel.
Figure 13:
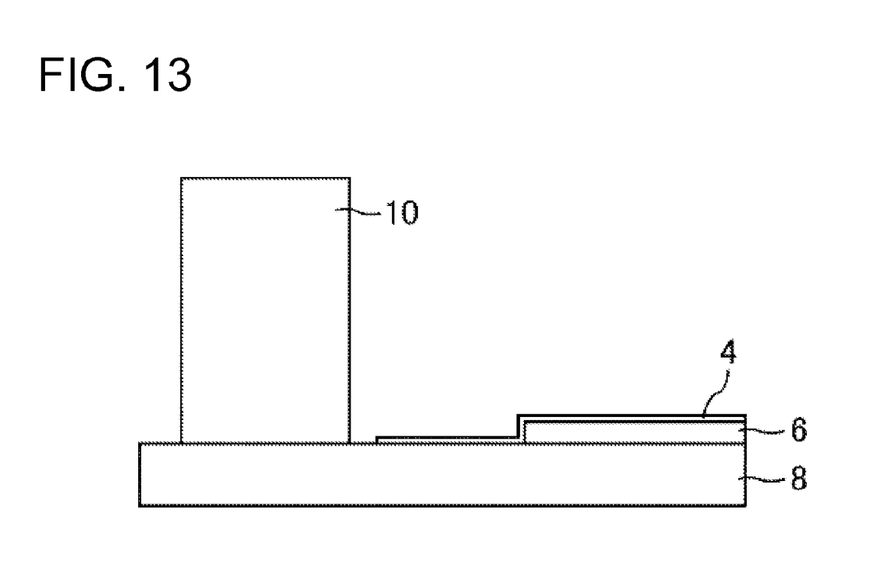
FIG. 13 is a cross-sectional schematic view showing a substrate in a conventional display panel.

Further, similar to the patterning method of the alignment film described above, there is a method in which an alignment film 4 is applied in a broader region; an alignment film patterning region 18 is formed by patterning using a laser irradiation 16 or the like; and then, a sealing member 10 is disposed inside the alignment film patterned region 18 (see FIGS. 12 and 13, for example). Further, there is a method in which the alignment film is applied after a portion of a surface on which the sealing member will be disposed is processed to have a reduced coating affinity so that the alignment film can be removed therefrom. However, it was difficult to remove the alignment film securely and sufficiently.

The present invention takes into account the current situation described above, and has an object of providing a display panel in which the adhesion strength of the sealing member is improved and moisture permeation caused by the alignment film can be reduced without performing a treatment to remove the alignment film.

Means for Solving the Problems

The inventor of the present invention conducted various investigations with respect to a display panel that can be obtained without performing an alignment film removing treatment and that has an improved adhesion strength of the sealing member and reduced moisture permeation caused by the alignment film. The inventor focused on a shape of a side face of an edge of a transparent resin film. The inventor found that it is possible to create a region where the alignment film is not present by way of adjusting the shape of the side face of the edge of the transparent resin film, and discovered that the alignment film can be separated by that side face of the edge so that the transparent resin film can be affixed to the sealing member without having the alignment film therebetween, thereby making a display panel having reduced moisture permeation that would have been caused by the alignment film without performing the alignment film removing treatment. In addition, the inventor found that the adhesion strength of the sealing member can be improved by supporting the sealing member with the transparent resin film that have been formed into a reverse tapered shape. The inventor concluded that the above-mentioned problems could be solved in an excellent manner, and reached the present invention.

Thus, the present invention is a display panel having a pair of substrates attached to each other via a sealing member, wherein at least one of the pair of substrates has a configuration in which a transparent resin film and an alignment film are laminated, and wherein a side face of an edge of the transparent resin film has a reverse tapered shape; the alignment film is separated at the side face of the edge; and the transparent resin film and the sealing member are attached to each other without having the alignment film therebetween.

The present invention is a display panel having a pair of substrates attached to each other with a sealing member therebetween. The pair of substrates are components of the display panel, and are typically constituted of a substrate (back substrate) that is disposed on a back surface side and a substrate (viewing surface side substrate, front substrate) that is disposed on a viewing surface side. The sealing member is also a component of the display panel, and is typically provided in a frame shape in a frame region in order to seal and secure the space between the pair of substrates. Here, in a display region, an optical element, such as a liquid crystal display element (optical element having a pair of electrodes and a liquid crystal layer disposed between the pair of electrodes) or the like, is typically disposed between the pair of substrates.

The alignment film covers at least a portion of a sealing member arrangement region. Thus, the alignment film may cover only a portion of the sealing member arrangement region. Alternatively, the alignment film may cover the entire arrangement region of the sealing member. The sealing member arrangement region is a region below the sealing member where the sealing member is disposed. Moisture permeation caused by the alignment film can be reduced by separating the alignment film at the side face of the edge and by attaching the transparent resin film to the sealing member without having the alignment film therebetween. Furthermore, the adhesion strength of the sealing member can be improved without performing the alignment film removing treatment by supporting the sealing member with the transparent resin film that has been formed into a reverse tapered shape.

Figure 1:
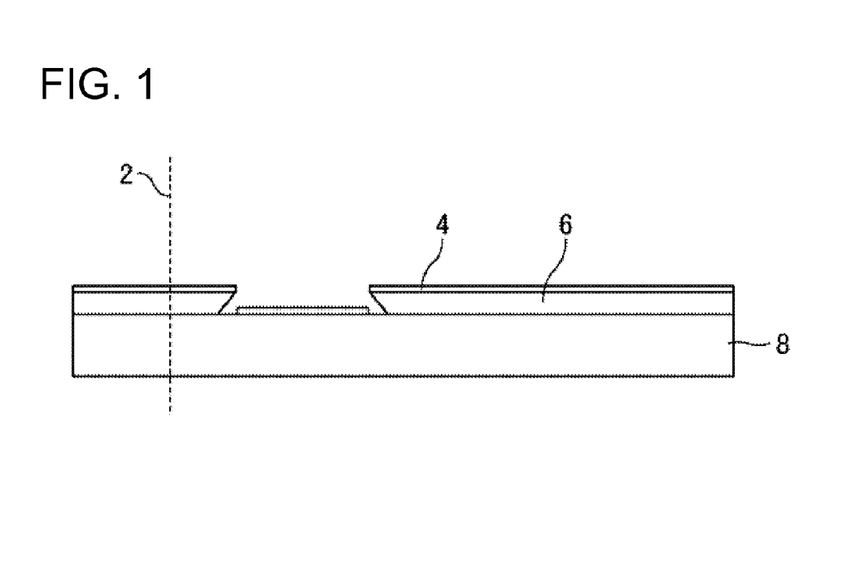
FIG. 1 is a cross-sectional schematic view showing a substrate in a display panel according to Embodiment 1.

The reverse tapered shape means that the transparent resin film is formed so as to become wider in directions in the substrate plane from the substrate side towards the transparent resin film side, as shown in FIG. 1, for example. By having this shape, the alignment film is not coated on a side face of the edge when applying the alignment film, and as a result, the alignment film is separated. By disposing a sealing member thereon, the transparent resin film and the sealing member can be attached to each other without having the alignment film therebetween.

A preferable upper limit of the thickness of the alignment film at the time of application is 1.2 µm or less. A preferable lower limit is 0.8 µm or more. Furthermore, a preferable upper limit of the thickness after drying and baking is 0.12 µm or less. A preferable lower limit is 0.08 µm or more.

A preferable upper limit of the thickness of the transparent resin film is 3 µm or less. A preferable lower limit is 2 µm or more.

In the tapered shape described above, an inclination of the side face of the edge relative to the plane of the substrate (an inclination of a line segment connecting the shortest distance on the side face of the edge from the upper surface to the lower surface of the transparent resin film with respect to the substrate plane) is sufficient as long as the effects of the present invention can be realized. However, the upper limit preferably is 80° or less. Furthermore, the lower limit preferably is 60° or more.

In a display panel according to the present invention, on a surface of the back substrate and/or the front substrate, a polyimide resin is applied by a printing method or the like. The alignment film can be formed this way. As a printing method, flexo printing, offset printing, or the like can be used, for example. Here, the type of the application solution for forming the alignment film is not particularly limited. As the application solution, the material of the alignment film may be fluidized, the material of the alignment film may be dissolved in a solvent, or the material of the alignment film may be dispersed in a dispersion medium, for example.

The display panel of the present invention is obtained by attaching a pair of substrates to each other with a sealing member therebetween. The sealing member preferably is constituted of an organic material. The sealing member is selected taking into account a manufacturing facility, curing conditions, the takt time, and the like. Because of this, an organic material is often selected as the material for the sealing member. As the organic material of the sealing member, a thermosetting resin such as an epoxy resin or the like, an ultraviolet curable resin such as an acrylic resin or the like, a resin that is both thermosetting and ultraviolet curable, and the like can be suggested. As a formation method of the sealing member made of an organic material, a screen printing method, a dispenser drawing method, and the like can be suggested.

Further, in the display panel of the present invention, liquid crystal is typically encapsulated between the substrates by a drip method, an injection method, or the like. Here, in the display panel of the present invention, the display panel may be an active matrix type display device having gate wires (scan lines), source wires (signal lines) that are orthogonal to the gate wires, and pixel TFTs (thin film transistors) disposed at intersections of the gate wires and the source wires on the same substrate as the substrate on which a circuit unit is disposed. A display device according to the present invention can be suitably used in an active matrix type liquid crystal display device and the like.

The circuit unit preferably has TFTs. The TFTs may be amorphous silicon (a-Si) TFTs, polysilicon (p-Si) TFTs, continuous grain silicon (CGS) TFTs, or microcrystalline silicon (µc-Si) TFTs. Furthermore, a built-in circuit unit inside the display panel is not particularly limited, and a gate driver, a source driver, a power circuit, an optical sensor circuit, a temperature sensor circuit, a level shifter, and the like can be suggested. As a configuration of the gate driver, a configuration constituted of a shift register and a buffer that temporarily stores a selection pulse sent from the shift register can be suggested, for example.

Further, the display panel preferably has the circuit unit on the substrate. By incorporating the circuit unit into the display panel, the circuit unit does not have to be attached externally to the substrate of the display panel. Therefore, the display panel can be made thinner, and reduction of the number of parts, reduction of the number of mounting steps, and the like can be achieved. Furthermore, the substrate on which the circuit unit is disposed may be either the back substrate or the front substrate. However, the back substrate is preferable.

As long as the configuration of the display panel of the present invention is formed by using these constituent elements as primary elements, the configuration is not particularly limited by other constituent elements.

Preferred configurations of the display panel of the present invention are described in detail below.

In a preferred configuration of the display panel of the present invention, a configuration in which the transparent resin film extends from the both end sides of the substrate towards the sealing member arrangement region when viewed from the planar surface of the substrate; both of the side faces of the edges have reverse tapered shapes; and the alignment film is separated at the side faces of the edges so that the transparent resin film and the sealing member are bonded to each other without having the alignment film therebetween can be adopted. Because the alignment film is separated at both of the side faces of the edges, and because the transparent resin film and the sealing member are bonded to each other without having the alignment film therebetween, effects of reducing moisture permeation caused by the alignment film can be improved further without performing a step of removing the alignment film. Furthermore, both of the side faces of the edges have reverse tapered shapes, and the sealing member is supported from (held between) both sides by the transparent resin films formed into reverse tapered shapes. This way, the adhesion strength of the sealing member can be improved further.

In the above-mentioned configuration having the sealing member held between the transparent resin films, an interval b2 between the tapered shapes on the substrate surface preferably is one-third or more of a width b1 (see FIG. 2, for example) of the sealing member when viewed from a side face (cross-section) of the substrates showing both ends of the substrates from which the transparent resin films extend. More preferably, the interval b2 is a half of the width b1 or more. Further, the upper limit preferably is nine-tenths or less, for example.

By having the interval b2 within this range, the sealing member can be disposed between the transparent resin films in a more secure manner, and the adhesion strength of the sealing member can be further improved.

Furthermore, the present invention is also a liquid crystal display device having the display panel of the present invention.

Scribing and dicing operations or the like are performed, as needed, to manufacture the display panel of the present invention. Then, various other components, such as a driver device, a case, a light source, and the like, as needed, are installed to the display panel. This way, a liquid crystal display device that prevents the adhesion strength of the sealing member from lowering and that can reduce moisture permeation caused by the alignment film in the same manner as the display panel of the present invention can be obtained.

The respective configurations described above may be appropriately combined within a scope that does not depart from the purport of the present invention.

Effects of the Invention

According to the present invention, it is possible to obtain a display panel in which the adhesion strength of the sealing member is improved by supporting the sealing member with a transparent resin film that is formed into a reverse tapered shape and the like and in which moisture permeation can be reduced by attaching the transparent resin films and the sealing member to each other without disposing the alignment film therebetween.

DETAILED DESCRIPTION OF EMBODIMENTS

A circuit substrate is also referred to as a TFT side substrate. The substrate side is also referred to as a TFT side.

In the embodiments of the present invention, because the opposite substrate is a substrate on which a color filter (CF) is disposed, the opposite substrate may be referred to as a CF side substrate. The opposite substrate side may be referred to as a CF side.

A frame region is a region excluding a display surface in a liquid crystal display device (peripheral region of the display surface).

Embodiments are provided below to describe the present invention in detail with reference to figures. However, the present invention is not limited to these embodiments only.

Embodiment 1

Figure 2:
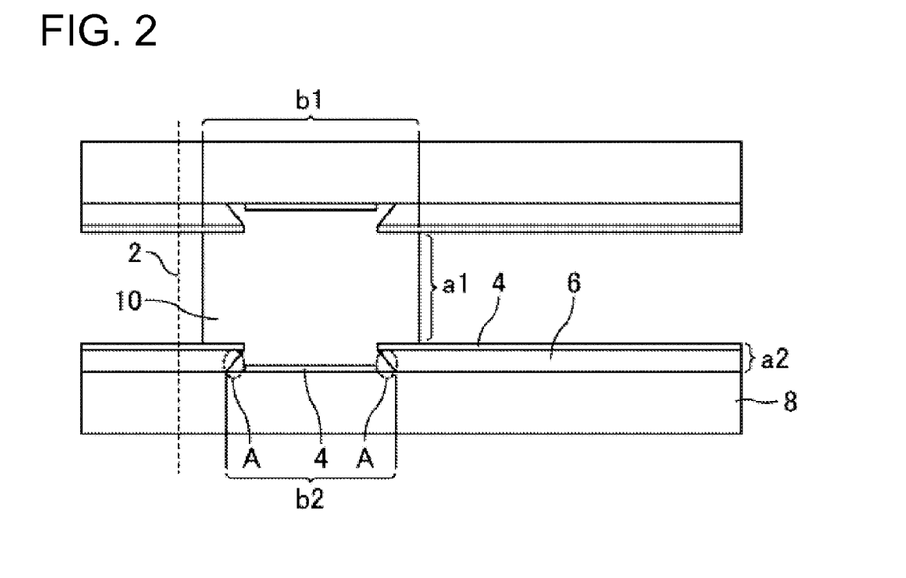
FIG. 2 is a cross-sectional schematic view showing a display panel according to Embodiment 1.

FIGS. 1 and 2 are cross-sectional schematic views showing a substrate of a display panel of Embodiment 1 and the display panel thereof, respectively. Here, FIG. 1 shows the substrate before a sealing member 10 is disposed. FIG. 2 shows the display panel after the sealing member 10 is disposed.

A transparent resin film 6 is formed to extend to an arrangement region of the sealing member 10, and side faces of edges of the transparent resin film 6 are formed into a reverse tapered shape.

Here, in regions in which the sealing member 10 is disposed, it is sufficient if at least one of the side faces of the edges has the reverse tapered shape. The other side face of the edges may be in a forward tapered shape, a vertical surface shape other than the tapered shape, a curved shape, or the like. The formation method of the reverse tapered shape is not particularly limited. The reverse tapered shape can be formed by printing an acrylic resin, which is a negative type photosensitive material, and by performing a photolithography step, for example.

Here, the transparent resin film 6 is formed on a substrate 8 shown in FIGS. 1 and 2, and is an insulating film and/or a surface planarization film or the like, for example. Here, the substrate 8 typically is a TFT substrate and/or a CF substrate.

An alignment film 4 is applied in an extended area taking into account possible variations in coating the alignment film 4. The alignment film 4 is applied so as to cover either a portion of the arrangement region of the sealing member 10 or the overall arrangement region of the sealing member 10, for example. Because the side face of the edge of the transparent resin film 6 has the reverse tapered shape as described above, there is a portion (portions A in FIG. 2, for example) on which the alignment film 4 is not applied even when the alignment film 4 is applied in order to cover the arrangement region of the sealing ember 10. Specifically, the thickness of the alignment film 4 at the time of the alignment film application is approximately 1 µm (thickness after drying and baking is approximately 0.1 µm). However, the transparent resin film 6 has a thickness that is a few times as large as the thickness of the alignment film (approximately 2 to 3 µm). Therefore, on at least an upper face of the side face of the edge (reverse tapered shape portion) of the transparent resin film 6, there is a region where the alignment film is absent. Furthermore, on a planar surface under the side face of the edge, there is also a portion where the alignment film 4 is not applied. After applying the alignment film 4, the alignment film 4 is dried and baked. After baking the alignment film 4, a rubbing treatment and/or cleansing may be performed.

Thereafter, the sealing member 10 is applied without patterning (partially removing) the alignment film 4 in order to bond the TFT substrate to the CF substrate. This attachment method is not particularly limited. The substrates may be attached to each other after liquid crystal has been dripped, or they may be attached to each other before injecting the liquid crystal.

The sealing member is cured by an application of heat or the like. The sealing member 10 is also filled and formed in the portions A shown in FIG. 2. The sealing member 10 may not be able to ensure a sufficient level of adhesion strength in a region where the alignment film has been formed. However, the sealing member 10 can be supported and secured in a sufficient manner by the side faces of the transparent resin film 6 formed in a reverse tapered shape. This way, the adhesion strength of the sealing member can be improved. Furthermore, even when the alignment film 4 is formed so as to cover the arrangement region of the sealing member 10, the portions A where the alignment film is not applied are created in the present embodiment. Thus, a portion of the sealing member 10 is directly attached to the transparent resin film 6 and to the substrate 8 without having the alignment film 4 therebetween, and is cured. In the present embodiment, portions where the alignment film 4 is separated are reliably provided and the alignment film is not coated in a continuous manner. Therefore, moisture permeation caused by the alignment film can be reduced.

After attaching the substrates to each other, the substrates can be cut along a division line shown in FIGS. 1 and 2, for example. Alternatively, the alignment film 4 may be applied on the substrate 8 that is already cut. Here, the display panel of the present invention does not limit the cutting step.

FIG. 2 shows a configuration in which the same reverse tapered shapes are formed in the transparent resin films 6 on both of the substrates. However, the transparent resin films 6 on these two substrates may not have the same reverse tapered shapes, respectively. Moreover, a configuration in which the reverse tapered shapes are formed only on one of the substrates may be used. Effects of the function of the present embodiment can be achieved in any one of these configurations. This also applies to modification examples below and other applicable configurations.

Figure 3:
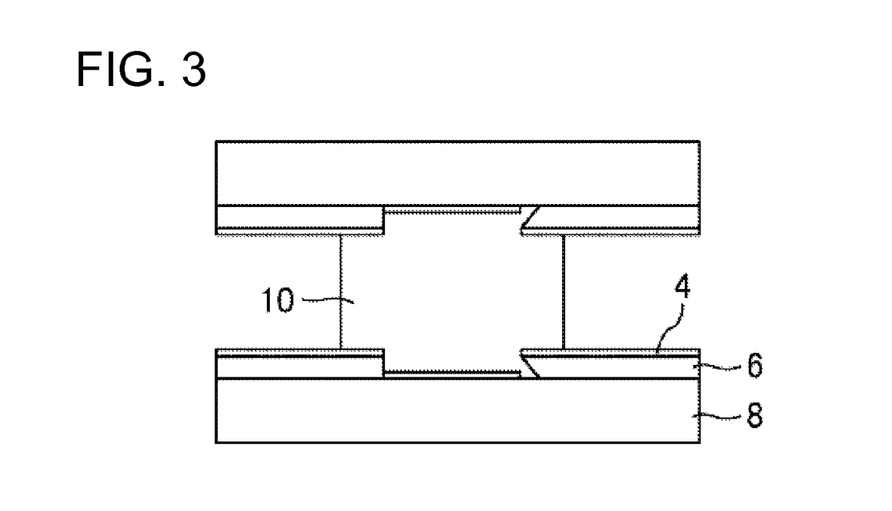
FIG. 3 is a cross-sectional schematic view showing a display panel according to a modified example of Embodiment 1.
Figure 4:
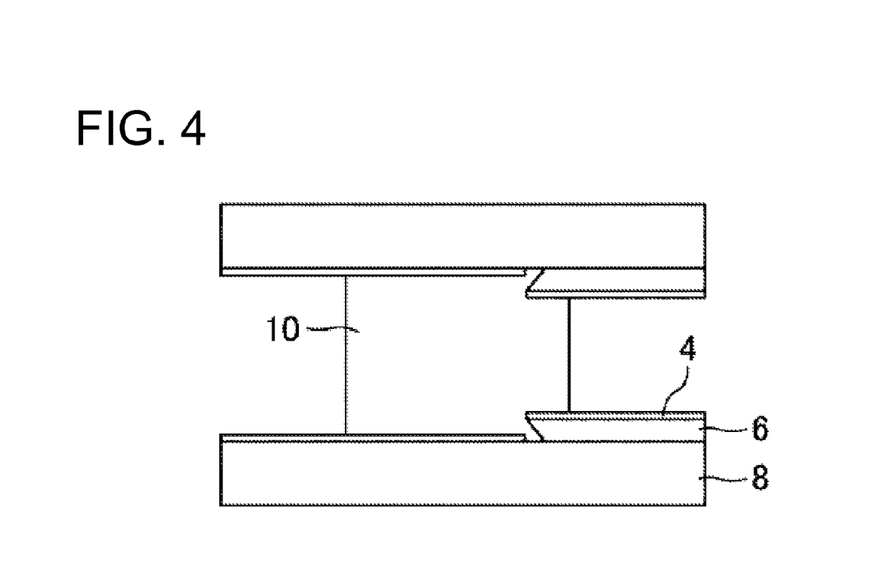
FIG. 4 is a cross-sectional schematic view showing a display panel according to a modified example of Embodiment 1.

FIGS. 3 to 4 are cross-sectional schematic views showing display panels that are modification examples of Embodiment 1.

Figure 5:
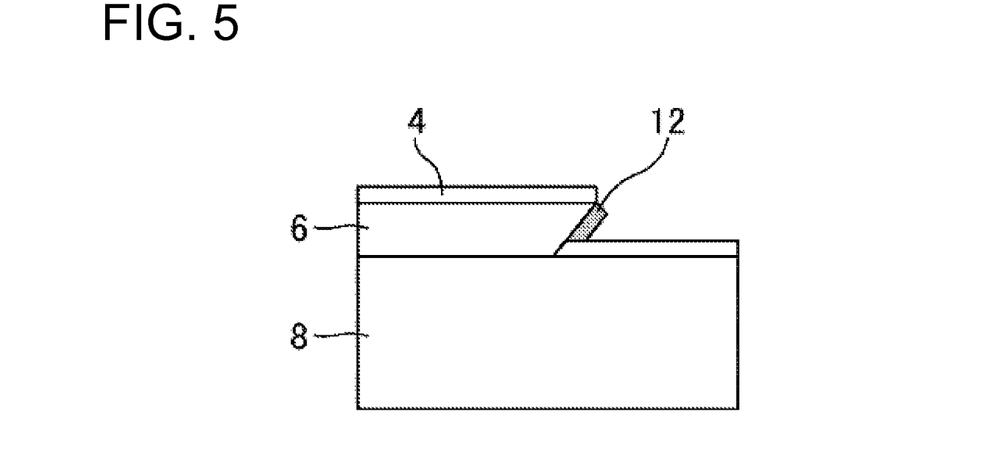
FIG. 5 is a partially expanded view showing a substrate in a display panel according to a modified example of Embodiment 1.
Figure 6:
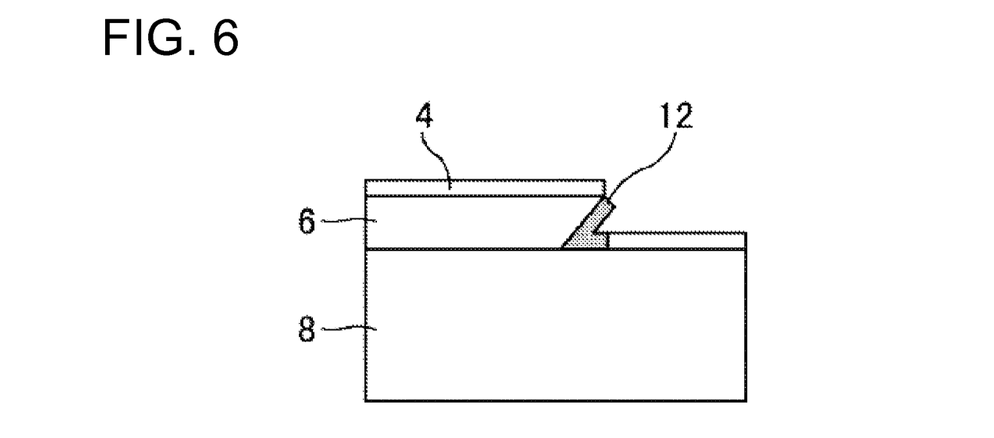
FIG. 6 is a partially expanded view showing a substrate in a display panel according to a modified example of Embodiment 1.

FIGS. 5 to 6 are partially magnified views showing substrates in display panels that are modification examples of Embodiment 1.

In FIG. 2 described above, the transparent resin film 6 extends under the arrangement region of the sealing member 10 from both sides to form the reverse tapered shape on both sides. However, as a modification example of Embodiment 1, the reverse tapered shape may be formed only on one side (FIG. 3). Alternatively, the transparent resin film 6 may extend under the arrangement region of the sealing member 10 from one side to form the reverse tapered shape formed of the transparent resin film 6 only on one side, and the alignment film may be applied directly on the substrate on the other side (FIG. 4).

Further, the alignment film 4 before drying may be fluidized by a solvent, and the alignment film 4 may be attached up to the substrate surface directly below the reverse tapered shape (see FIG. 5). However, a configuration in which the alignment film 4 is not attached to the substrate surface directly under the reverse tapered shape is preferable (see FIG. 6). By using this configuration, the sealing member 10 can be supported by the transparent resin film formed in the reverse tapered shape in a more secure manner, thereby further improving the adhesion strength of the sealing member 10.

Figure 7:
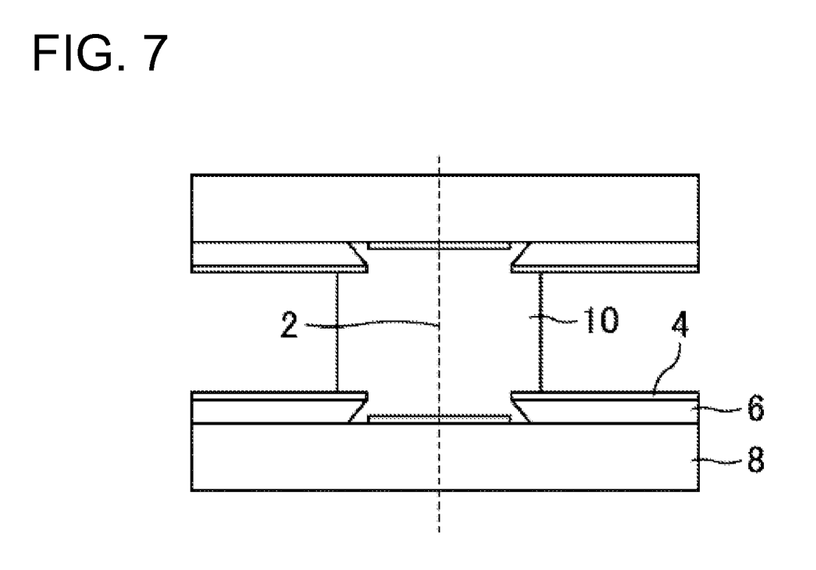
FIG. 7 is a cross-sectional schematic view showing a display panel according to a modified example of Embodiment 1.
Figure 8:
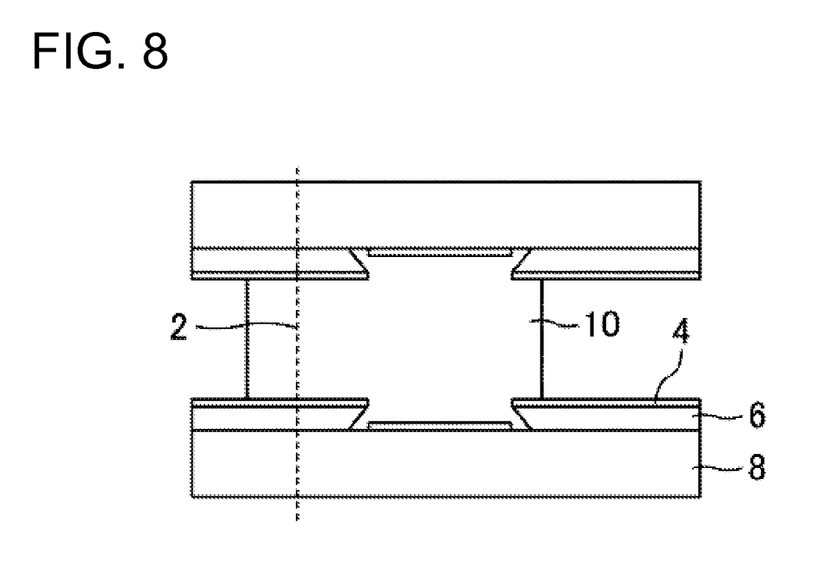
FIG. 8 is a cross-sectional schematic view showing a display panel according to a modified example of Embodiment 1.
Figure 9:
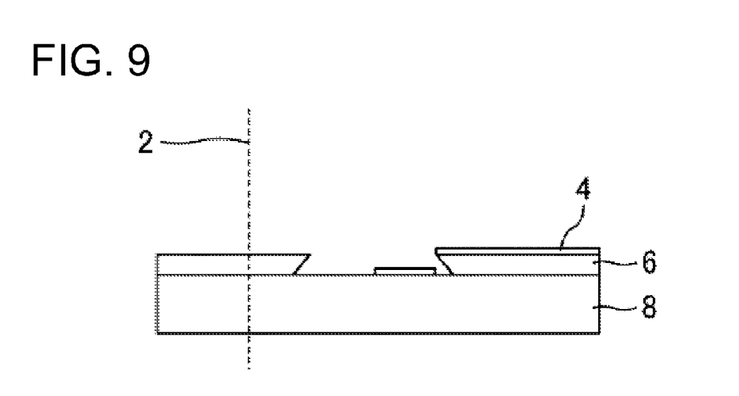
FIG. 9 is a cross-sectional schematic view showing a substrate in a display panel according to a modified example of Embodiment 1.

FIGS. 7 to 8 are cross-sectional schematic views showing display panels that are modification examples of Embodiment 1. FIG. 9 is a cross-sectional schematic view showing a substrate in a display panel that is a modification example of Embodiment 1.

In FIG. 2 described above, a division line 2 is on an outer side of the sealing member 10. However, the division line 2 may be placed in the sealing member 10, for example. The division line 2 may be positioned at the center of the sealing member 10 (FIG. 7), or the sealing member 10 may be formed so as to extend to the left side to overlap the division line 2 (FIG. 8), for example. Here, the division line 2 may be absent (the division step is not performed), and the alignment film 4 may be applied on the substrate 8 that has been cut into an individual piece.

In FIG. 2 described above, the alignment film 4 is coated so as to overlap the division line 2. However, it is sufficient if the alignment film 4 is applied such that display anomalies inside an active area caused by an uneven application of the alignment film 4 can be prevented. The alignment film 4 may be applied so as to partially overlap the arrangement region of the sealing member 10 (FIG. 9), for example. Here, in the display panel of the present embodiment, as long as the alignment film 4 is applied up to the arrangement region of the sealing member 10 in a portion of the display panel, and as long as the alignment film 4 and the like meet the configuration requirements of the present invention in that portion, there may be a portion where the alignment film 4 is not applied up to the arrangement region of the sealing member 10 in another portion of the display panel.

Further, it is sufficient if the display panel of the present embodiment meets the configuration requirements of the present invention described above, and the configuration of the underlying structure upon which the transparent resin film 6 is to be formed in the arrangement region of the sealing member 10 is not particularly limited. Thus, another layer may be disposed between the transparent resin film 6 and the substrate 8. The transparent resin film 6 may be formed on a base coat film in the TFT substrate, for example. Further, in the CF substrate, the transparent resin film 6 may be formed on a BM (black mask).

The respective configurations of the embodiments described above may be appropriately combined as long as such combinations do not depart from the purport of the present invention.

Here, the present application claims priority to Patent Application No. 2009-261205 filed in Japan on 16, 2009 under the Paris Convention and provisions of national laws of a designated State. The entire contents of which are hereby incorporated by reference.

Description of Reference Characters
- 2 division line
- 4 alignment film
- 6 transparent resin film
- 8 substrate
- 10 sealing member
- 12 region where an alignment film is absent
- 14 distance between a sealing member and an active area secured taking into account an uneven application of the alignment film
- 16 laser irradiation
- 18 alignment film patterning region
- A regions where an alignment film is not applied
- a1 thickness of a sealing member on an alignment film
- b1 width of a sealing member
- b2 interval between tapered shapes on a substrate surface

The invention claimed is:

1. A display panel, comprising a pair of substrates attached to each other with a sealing member therebetween,
   wherein on at least one of said pair of substrates, a transparent resin film and an alignment film are laminated, and
   wherein a side face of an edge of said transparent resin film has a reverse tapered shape, the alignment film is separated at said side face of the edge, and the transparent resin film and the sealing member are bonded to each other without having the alignment film therebetween on at least a portion of said side face of the edge of said transparent resin film.

2. The display panel according to claim 1, wherein said transparent resin film extends at least partially into a sealing member arrangement region upon which the sealing member is disposed from both sides of said sealing member arrangement region when viewed in a plan view; each of the side faces of the edges have the reverse tapered shape; the alignment film is separated at said side faces of the edges; and the transparent resin film and the sealing member are bonded to each other without having the alignment film therebetween on at least a portion of said side faces of the edges of said transparent resin film.

3. A liquid crystal display device, comprising the display panel according to claim 1.

* * * * *